R. G. AVERILL.
TROLLEY TENDER.
APPLICATION FILED AUG. 5, 1918.
1,353,507. Patented Sept. 21, 1920.
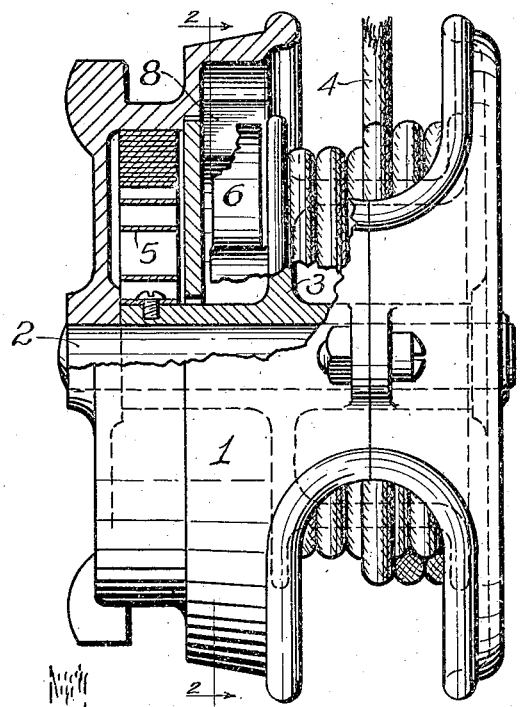
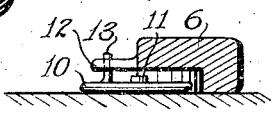
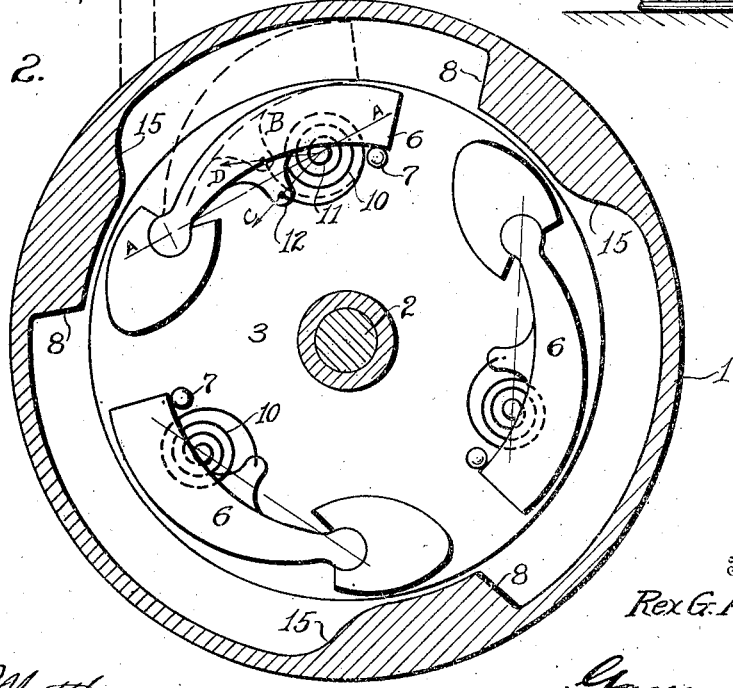
Witness
S. S. Matthew
Inventor
Rex G. Averill
By
Attorney

UNITED STATES PATENT OFFICE.

REX G. AVERILL, OF MANSFIELD, OHIO, ASSIGNOR TO THE OHIO BRASS COMPANY, OF MANSFIELD, OHIO, A CORPORATION OF NEW JERSEY.

TROLLEY-TENDER.

1,353,507.  Specification of Letters Patent.  Patented Sept. 21, 1920.

Application filed August 5, 1918. Serial No. 248,323.

*To all whom it may concern:*

Be it known that I, REX G. AVERILL, a citizen of the United States, residing at Mansfield, in the county of Richland and State of Ohio, have invented certain new and useful Improvements in Trolley-Tenders, of which the following is a specification.

This invention relates to trolley catchers and retrievers and has particular reference to the centrifugal dogs and the means employed for maintaining the latter in either operative or inoperative position with reference to stop members.

The primary object of this invention is to provide simple and effective means which tend to yieldably maintain the centrifugal dogs in either operative or inoperative position.

To the attainment of this end and the accomplishment of other new and useful objects, as will appear, the invention consists in the novel features of the construction, combination and arrangement of the several parts hereinafter described and shown in the accompanying drawings, in which:—

Figure 1 is a side view of a trolley tender shown partly in section to illustrate the structural arrangement of the several parts.

Fig. 2 is a sectional view taken on the line 2—2 of Fig. 1.

Fig. 3 is a detail view of one of the springs and a sectional view through one of the dogs and illustrates the arrangement of the parts and the manner in which they are connected.

Referring to the drawings and in which similar reference characters indicate the same parts throughout the various views, (1) designates the case of a well-known trolley tender which I have selected for the purpose of illustrating one embodiment of my invention. It will be understood however that the invention is not limited to this type of tender, but can readily be applied to other types of trolley tenders as well.

Rotatably mounted upon the spindle (2), is a reel (3) which provides for a sufficient number of turns of trolley rope (4). A spring (5) is provided, one end of which is secured to the case and its other end is connected to the reel in the usual or any desirable manner. In operation this spring tends to constantly urge the reel to rotate in the direction to wind up the trolley rope and thus provides for the taking up or normally keeping the slack out of the trolley rope. Pivotally supported by means of suitable lugs formed integrally on one side of the reel (3) are dogs (6), which normally are held in the retracted or inoperative potion against pins (7), as shown in solid lines, Fig. 2 and which when in this position permit free rotation of the reel in the rope winding or unwinding direction. In practice, one or more of these dogs are thrown outward and into an operative position with the stops (8) by centrifugal force upon rapid rotation of the reel as when the trolley pole jumps the wire and flies upwardly.

The dogs when in operative position are arranged to engage and to coöperate with stops (8), provided in the case thereby to interlock the reel with the case against relative rotation in the direction to unwind the rope and thus prevent upward movement of the trolley pole. When the dog strikes the stop the reel has the tendency to revolve in the opposite direction due to a rebound of the trolley pole and the action of the spring (5) and to such an extent that the dog and stop will separate slightly. This counter-revolution of the reel necessitates the provision of means for maintaining the dog in its outward or operative position while separated from the stop by reason of the rebound of the trolley pole.

The structure which I have above described is old and well known in the art and is not claimed by me except as in combination with my improved means for yieldably maintaining the dogs in either a retracted or in an outward position. In accordance with my invention I provide each of the dogs (6) with a spiral spring (10) which has one end pivotally secured to a spring stud (11) provided on the reel and the other end of this spring pivotally engages the dog which as shown may be provided with an ear (12). The dog has a perforation to receive the bent up end (13), of the spring as shown in Fig. 3. The outer end of the spring engages the dog at a point which assumes a position at opposite sides of the dead center line A—A when the dog is moved from its inner to its outward position. By dead center line I mean to comprehend a straight line passing through the pivot center of the dog and the center of spring stud (11) as indicated by the line A—A.

The spring 10 is preferably bent in the form of an ordinary spiral and when arranged in position exerts no torsional pressure as such but does exert pressure on the dog in the direction only away from the pivotal spring stud 11 or substantially in the direction toward the pivotal point of the dog as noted by the arrowed line C and D, this being due to the spring being pivoted at 11 and 13 and the distance between the points 11 and 13, when the spring is installed, is less than it normally would be when not installed, thus exerting a force tending to separate the points 11 and 13 in the direction of the arrowed line C and D. Consequently, when the dog B is in the solid line or retracted position shown in Fig. 2, and in which position the end (13) of the spring engages the dog at a point below the dead center line, a pressure of the spring will be exerted upon the dog in the direction indicated by the arrow C, and obviously will yieldably maintain the dog in engagement with the stop (7). Likewise, when the dog is thrown to its outward position, as shown in dotted lines, the point at which the spring engages the dog will move above the dead center line and in this position the spring exerts pressure upon the dog in the direction indicated by the arrow D, and yieldably maintains the dog in its outward position. Thus it will be seen that the spring (10) serves to yieldably maintain the dog in either position.

For the purpose of resetting the dog from its outward position to its inward or retracted position, I provide a shoulder (15) which will engage the dog and force it to move inward and into retracted position when the reel is rotated in the rope winding direction or against the pull of the trolley rope.

Having fully described my invention and illustrated one embodiment thereof, I do not wish to be limited to the details of the construction shown as these can obviously be changed without departing from the spirit and scope of the invention.

I claim:—

1. In a trolley tender the combination with a case, a reel rotatably mounted therein, a dog pivotally supported by the reel and normally out of engagement with the case but movable into operative engagement therewith, of a single operating means to maintain the dog in one position when normally out of engagement with the case and to maintain the dog in another position when in operative engagement with the case, and means to move the dog into normal position after engaging the case.

2. In a trolley tender the combination with a case, a reel rotatably mounted therein, a spring urging the reel to rotate in one direction, and a dog pivotally secured to the reel and normally out of engagement with the case, but movable outward by rapid rotation of the reel, and into engagement with the case to interlock the reel against rotation in the direction as against the action of the spring, of means to yieldably maintain the dog in its normal position out of engagement with the case and serving also, to yieldably maintain the dog in its outward or operative position when moved into engagement with the case, and means to move the dog into normal position after engaging the case.

3. In a trolley tender, the combination with a case, a reel rotatably mounted therein, and a dog pivotally supported by the reel and normally held in a retracted position or out of engagement with the case, but movable outward, by rapid rotation of the reel, and into an operative position to a stop provided in the case, thereby preventing rotation of the reel in one direction, of yieldable means engaging the dog and resisting movement of the latter in one direction, when in one position, and resisting movement of the dog, in the opposite direction, when in the other position, and means for resetting the dog into normal position.

4. In a trolley tender the combination with a case, a reel rotatably mounted therein, and a dog carried by the reel and normally disposed in an inoperative position, but movable outwardly, by centrifugal force, and into an operative position to engage a stop provided in the case and thereby interlock the reel with the case against relative rotation in one direction, of resilient means connected to the reel and the dog and resisting movement of the latter from the inoperative to the operative position under a predetermined amount of centrifugal force, and serving also to yieldingly maintain the dog in its operative position when disposed therein, and means to coöperate with the dog to restore the latter to its inoperative position by rotation of the reel in a rope-winding direction.

5. In a device of the character described, a case, a spindle in the case, a reel rotatably mounted on the spindle, a spring urging the reel to rotate in one direction, a dog pivotally supported by the reel and normally disposed in an inoperative position, but movable outward, by centrifugal force, and into an operative position to coöperate with a stop provided in the case to interlock the reel with the case against relative rotation in the direction against the action of the spring, and a spiral spring connected to the reel and the dog and tending to yieldably maintain the latter in either inoperative or operative position, and means to move the dog into inoperative position from the operative position.

6. A trolley tender comprising in combination a case, a reel rotatably mounted therein to receive a trolley rope, a centrifugal dog pivotally secured to the reel, said dog being disposed in one position under normal operation of the device and movable to another position under the influence of centrifugal force upon rotation of the reel to exceed a predetermined speed, yieldable means connected to the reel and dog and operating to urge the dog to rotate in one direction when in one position and in the opposite direction when in the other position, and means to move the dog to its normal operating position.

7. A trolley tender comprising in combination a case, a reel rotatably mounted therein, a centrifugal dog pivotally secured to the reel and held in an inward position during rotation of the reel not to exceed a predetermined speed, but movable into an outward position by centrifugal force upon rotation of the reel to exceed said predetermined speed, a spring connected to the dog and reel, said spring operating to resist movement of the dog from either one of its two positions to the other position, a stop in the case engageable by the dog when the latter is in outward position for locking the reel with the case against relative rotation in one direction, and a shoulder in the case engaging the dog upon rotation of the reel in the opposite direction for moving the dog into its inward position.

In testimony whereof I affix my signature.

REX G. AVERILL.